(12) United States Patent
Adsul

(10) Patent No.: US 12,373,946 B2
(45) Date of Patent: Jul. 29, 2025

(54) ASSAY READING METHOD

(71) Applicant: FORSITE DIAGNOSTICS LIMITED, Avon (GB)

(72) Inventor: Neeraj Adsul, Avon (GB)

(73) Assignee: Forsite Diagnostics Limited, Avon (GB)

( * ) Notice: Subject to any disclaimer, the term of this patent is extended or adjusted under 35 U.S.C. 154(b) by 387 days.

(21) Appl. No.: 17/924,432

(22) PCT Filed: May 4, 2021

(86) PCT No.: PCT/EP2021/061761
§ 371 (c)(1),
(2) Date: Nov. 10, 2022

(87) PCT Pub. No.: WO2021/228631
PCT Pub. Date: Nov. 18, 2021

(65) Prior Publication Data
US 2023/0177680 A1    Jun. 8, 2023

(30) Foreign Application Priority Data
May 11, 2020 (GB) .................................... 2006905

(51) Int. Cl.
*G06T 7/00* (2017.01)
*G06T 7/10* (2017.01)
*G06T 7/70* (2017.01)

(52) U.S. Cl.
CPC .............. *G06T 7/0012* (2013.01); *G06T 7/10* (2017.01); *G06T 7/70* (2017.01); *G06T 2207/20084* (2013.01)

(58) Field of Classification Search
CPC .. G06T 7/0012; G01N 21/8483; G01N 33/53; G01N 33/54388; G16H 10/40
See application file for complete search history.

(56) References Cited

U.S. PATENT DOCUMENTS 8,938,119 B1 *  1/2015  Han ........................ G06T 5/94
                                                    382/163
2007/0212054 A1 *  9/2007  Kobayashi ............. G03B 15/03
                                                    396/165
(Continued)

FOREIGN PATENT DOCUMENTS

EP        3581921 A1    12/2019
JP    2018524623 A  *   8/2018    ........... H04N 23/743
(Continued)

OTHER PUBLICATIONS

Kong, T., You, J. B., Zhang, B., Nguyen, B., Tarlan, F., Jarvi, K., & Sinton, D. (2019). Accessory-free quantitative smartphone imaging of colorimetric paper-based assays. Lab on a Chip, 19(11), 1991-1999. (Year: 2019).*

(Continued)

*Primary Examiner* — Emily C Terrell
*Assistant Examiner* — Jacqueline R Zak
(74) *Attorney, Agent, or Firm* — Sheppard Mullin Richter & Hampton LLP

(57) ABSTRACT

A method for reading a test region of an assay includes: capturing a plurality of images of an assay with an imaging device; from each image of the plurality of images, extracting a region of interest comprising pixels of the image associated with a test region of the assay; from each extracted region of interest, estimating respective intensity values of at least a portion of the pixels; grouping the estimated intensity values into one or more clusters, said grouping comprising determining a total number of intensity values grouped into each cluster and a variance of each cluster; selecting the cluster having a total number of intensity values at or above a predetermined threshold and a smallest variance; calculating a mean intensity value of the (Continued)

selected cluster; and outputting the calculated mean intensity value as a result of the assay.

18 Claims, 8 Drawing Sheets

(56) References Cited

U.S. PATENT DOCUMENTS

| | | | |
|---|---|---|---|
| 2013/0203043 A1 | 8/2013 | Ozcan et al. | |
| 2016/0125600 A1* | 5/2016 | Lee | G01N 21/8483 382/128 |
| 2016/0131592 A1 | 5/2016 | Cooper et al. | |
| 2022/0104736 A1* | 4/2022 | Berg | G01N 21/78 |

FOREIGN PATENT DOCUMENTS

| | | | |
|---|---|---|---|
| WO | 2012/012382 A1 | 1/2012 | |
| WO | 2014/113770 A1 | 7/2014 | |
| WO | 2016/087589 A1 | 6/2016 | |
| WO | 2016/166415 A1 | 10/2016 | |
| WO | WO-2019215199 A1 * | 11/2019 | ......... G01N 15/0625 |
| WO | 2020/016616 A1 | 1/2020 | |

OTHER PUBLICATIONS

International Preliminary Report on Patentability for Application No. PCT/EP2021/061761, mailed on Nov. 24, 2022, 13 pages.
Partial Search Report for Application No. PCT/EP2021/061761, mailed on Sep. 21, 2021, 21 pages.
International Search report and Written Opinion for Application No. PCT/EP2021/061761, mailed on Sep. 21, 2021, 21 pages.
Morgand et al., "Generic and Real-time Detection of Specular Reflections in Images", 2014 International Conference on Computer Vision Theory and Applications (VISAPP), Jan. 2014, vol. 1, pp. 274-282.
Mudanyali et al., "Integrated rapid-diagnostic-test reader platform on a cellphone", Lab on a Chip, Jan. 2012, vol. 12, No. 15, pp. 2678-2686.
Combined Search and Examination Report for Application No. GB2006905.0, mailed on Sep. 18, 2020, 7 pages.
Combined Search Report and Written Opinion for Application No. GB2203403.7, mailed on Apr. 6, 2022, 5 pages.

* cited by examiner

ASSAY READING METHOD

This application is a National Phase Application of International Patent Application No. PCT/EP2021/061761 filed on May 4, 2021, which is based on and claims priority to and benefits of British Patent Application No. GB 2006905.0, filed on May 11, 2020. The entire content of all of the above-identified applications is incorporated herein by reference.

TECHNICAL FIELD

The present disclosure is in the field of assay reading, in particular but not limited to reading lateral flow tests with a computer implemented method.

BACKGROUND

The following acronyms are used herein as follows:
HDR high-dynamic range
LFD lateral-flow device
LFDR lateral-flow reader
LFT lateral-flow test
NC nitrocellulose membrane
QC quality control
ROI region of interest An LFT typically consists of a sample pad attached to a conjugate pad attached to a nitrocellulose pad attached to an absorbent pad. Together these may form a dipstick. The dipstick is typically, but not always, housed in a closed plastic casing with one or more openings for applying a sample (such as, for example, blood, mucus, sputum, urine, milk, water or preparation as such including both animal and non-animal originating samples), to the sample pad, and a window through which a portion of the NC part of the LFT may be viewed by a user. The viewable portion of the NC part comprises the indicators of the assay in the form of patterns of lines or dots or other shaped regions. For colourimetric LFTs, these lines are formed from labels such as coloured organic dye or particles, metal particles and combinations thereof.

Typically, an LFT has a control line and at least one test line although there in some instances there may be up to 4 or more test lines on a single dipstick. A threshold value of the intensity of the control line determines whether flow of the sample through the assay was successfully completed after application of the sample to the sample pad and/or to indicate when the development time of the test lines has elapsed. If the intensity of the control line is as expected based on the LFT design specifications, the test results are deemed valid. If not, the test results are deemed invalid. Each test line typically tests for only one analyte (or group of structurally related analytes), i.e. each test line is an immunoassay using a specific set of antigens or antibodies, or other binding partners, to provide the test result for a specific analyte, and the intensity of the test line can be used to obtain a test result in a qualitative, semi-quantitative and/or in a fully quantitative manner. These are known as qualitative, semi-quantitative, and quantitative assays.

For a qualitative assay, the goal is to detect presence or absence of test line. Even a very weak intensity of the test line is considered as presence of line. An example of a well-known qualitative LFT is a pregnancy test.

For a semi-quantitative assay, the intensity change in the test lines has good reproducibility characteristics and this allows test results to be classified into one of a number of predetermined response threshold windows. If a signal intensity is between two thresholds it is indicative of a results range. Typically, three or more classification windows are used.

For a quantitative assay, a mathematical relationship is established between the intensity of the line and a set of reference calibrators. Quantitative assays have the potential to be the most accurate assay type. In particular, if all sources of measurement variability can be controlled and/or compensated for (e.g. variability in the assay reagents and components, measurement instrument sensitivity and precision, lighting conditions, and other sources of variability), then any change in signal intensity will be an accurate indication of the quantity of analyte present in the sample.

One way to control for measurement instrument variability is to provide a controlled environment in which the LFT may be read. Typically, this may be achieved by a benchtop lateral-flow reader with its own imaging hardware that enforces consistency in one or more of the following measurement conditions:
1. Illumination of the ROI and the test
2. Exposure to ambient light
3. Distance from LFT to the imaging system in 3-dimensions
4. Angular orientation of LFT towards imaging system in 3-dimensions Enforcing consistency of the above conditions ensures that testing conditions do not change with time within a single measurement time window of the instrument. Whilst in some cases there may be a variation across a large number of the same instrument models and/or long-term drift over much longer periods, these variations can normally be compensated for to some extent by way of calibration and by specifying tolerances as part of the manufacturing and quality control process.

However, whilst the accuracy of such benchtop readers is often very high and reliable, other considerations need to be taken into account when a point of care environment is considered. In particular, such benchtop readers are not always available in point of care testing where resources and budgets may be more limited. Indeed, high volume testing in the numbers needed to fight global pandemics such as the Covid-19 pandemic of 2020 is not presently practical as benchtop readers are not available in the required numbers. The logistics of transporting samples to and from facilities that do have access to a benchtop reader can be costly and delay results. Further, as benchtop reader hardware can be difficult to manufacture, scaling up manufacturing to provide all care environments with their own benchtop reader at very short notice (such as may be required in a pandemic response) is impractical.

One solution to overcome the above issues of a benchtop reader with its own imaging hardware is to use imaging hardware of smartphones instead. An advantage of this approach is that smartphones are immediately and widely available in the numbers required to implement mass testing of a population of the type that is required to fight global pandemics.

However, there are a huge number of different smartphones available on the market each with different imaging hardware. For a quantitative test to be reliable, the manner in which a colour/signal change of a test line is picked by the imaging hardware and interpreted by imaging software needs to be consistent so that the same mathematical relationship between the intensity of the line and a set of reference calibrators can be used to interpret the measurements. If that is not the case, measurement results will vary greatly depending on the smartphone used to take the image used for the measurement.

A number of approaches have been tried to overcome this problem. For example, accessory boxes and/or accessories that hold the LFT (or can be placed over an LFT) have been provided for plugging into or attaching to a smartphone. However, whilst these approaches are typically able to control the imaging environment, they still require third party, proprietary hardware which is not universal and which is fundamentally no different to a benchtop reader in that they do not function without the accessories.

Another approach is to place a reference imaging pattern or colour charts on the LFT housing, either temporarily during the test or permanently on the LFT casing/housing at manufacture. The reference imaging pattern or colour chart can be used to compensate for differences in how sensitive given imaging hardware is to different colours and light signals under different lighting conditions. However, this approach still requires a small accessory (in the case of a temporary reference pattern or colour chart) or adaptation of LFT production lines and designs (in the case of a permanent pattern or chart provided on the LFT casing). Such changes to designs and production lines are not practical in the periods in which massive scaling up of testing capacity is required as part of pandemic responses.

Furthermore, attempts to overcome lack of consistency of angular orientation (rotation and skew) between tests (i.e. condition 4 above) have typically relied on image processing using non-linear transforms. These types of transforms tend to introduce errors and other variations into the post-processed image that propagate through into the final, processed test result. Such approaches also fail to compensate for fundamental variations in smartphone imaging hardware that can cause artefacts and other noise in the measurement result.

An improved method of reading an assay that overcomes one or more of the above problems or at least provides a useful alternative is required.

SUMMARY

The aim of the present disclosure is to provide a method for reading an assay, such as a LFT, that does not need to use accessories or require hardware modification of an existing user device such as a smartphone. In particular, instead of using accessories or hardware modification to ensure consistency in imaging conditions across captured images, the present disclosure relies on data from a plurality of captured images of a ROI (region of interest—such as a test region of the LFT) of the assay, some or all of which may have been captured under different imaging conditions. By using a plurality of images, variations in imaging conditions may be averaged out and/or outliers removed.

According to the present disclosure, there is provided a method for reading a test region of an assay. The method comprises: capturing a plurality of images of an assay with an imaging device and, from each image of the plurality of images, extracting a region of interest comprising pixels of the image associated with a test region of the assay. As described above, the assay may be a lateral flow assay and the test region may accordingly comprise a portion of a test strip having a control and/or test line or spot thereon. The method further comprises, from each extracted region of interest, estimating respective intensity values of at least a portion of the pixels. The portion of pixels associated with the test region may comprise pixels corresponding to the test line and/or control line (or spot) of the assay and it is these pixels from which the intensity values may be estimated. The term intensity value is used herein to refer to, for example, a data value indicative of grayscale or colour values of a pixel. For example, if the image is a single channel grayscale image, the intensity value of each pixel may be an 8-bit data value with a range of 0 to 255. Similarly, if the image is a 24-bit image with red, green and blue channels, the pixel correspondingly has red, green, and blue data values. Other pixel intensity value types will be known to the skilled person and it is envisaged that these may be used with the present disclosure. If the intensity values of a test region are considered across the test region's length (for example, parallel to a flow direction of the test strip) they will be higher or lower depending on the colour of the pixels at the different positions. Accordingly, at the pixel positions corresponding to a test and/or control line, the intensity values will be different to the intensity values of the background test strip and/or other features on the test strip. If the intensity values were to be plotted against pixel position, these differences manifest themselves as peaks and/or valleys, the height of which would correspond to the intensity value of an associated test and/or control line. Accordingly, the intensity values of these pixels are indicative of a strength of a colour change of a test and/or control line and thus of a result of the assay test. When a plurality of images of the same test region are captured, the intensity value of the pixels of the test and/or control line will not always be the same. For example, a speck of dust, a reflection, or other artefact, and/or a change in lighting or other imaging conditions may cause the pixels of a test line to appear the same as a white background, leading to an anomalous intensity value not indicative of a correct reading of the test and/or control line. Accordingly, the method further comprises grouping the estimated intensity values from the plurality of images into one or more clusters, said grouping comprising determining a total number of intensity values grouped into each cluster and a variance of each cluster; selecting the cluster having a total number of intensity values at or above a predetermined threshold and a smallest variance; and calculating a mean intensity value of the selected cluster. Finally, this calculated mean intensity value may be outputted as a result of the assay.

Beneficially, the grouping into clusters, the selection of the best cluster (i.e. the one with at least a minimum number of members and the smallest variance), and the calculation of a mean value from the intensity values in the selected cluster ensure the above described anomalous intensity values do not significantly reduce the accuracy of the reading. Accordingly, accuracy is improved without reliance on hardware to minimise variations in the data during image capture with the use of accessories or hardware modification. The predetermined threshold may be any number, for example a number indicative of a cluster having a minimum size. Whereby, if no clusters meet the minimum size, a user may optionally be provided with a warning that the reading has been unsuccessful.

By way of non-limiting, simplified example, 20 images of the same test line of an assay may be captured by a smartphone. Some with the smartphone LED torch on and some with the LED torch off. One characteristic that is known to vary between assays and is hard to consistently calibrate for is the reflectivity of the nitrocellulose membrane part of the test strip. The reflectivity may vary for example according to which manufacturer supplied the nitrocellulose membrane. A weak test line in the cases of the torch being on will be overexposed and may thus appear as no more than washed out background on a few of the images where the torch is on (e.g. have a similar intensity value to the background). Similarly, a speck of dirt may move across a field of view including over the test line while the images are being captured and appear as a strongly black coloured pixels in the image. The intensity value associated with the dirt speck may thus be very high/low relative to the background and this may appear in a number of the images as it crosses the field of view. In contrast, in images where the test line is not overly exposed, the intensity values associated with test line may be closer to the true value. Accordingly, when the estimated intensity values in this example scenario are grouped into clusters, at least three clusters will be present. One cluster will be present with a small number of members with intensity values very similar to the background (i.e. the values from the washed out images, for example 3 of the 20 images). One cluster will be present with a higher number of members with intensity values that may be very high and/or low (i.e. the values from the image with the dirt speck that have high variance, for example 4 of the 20 images). One cluster will be present associated with the intensity values where the images were not overexposed and where the dirt speck was not present and which accordingly have a low variance, for example 13 of the 20 images. If the predetermined threshold was 10, the cluster of 13 will be selected. Had there been more than one cluster of meeting the threshold, the cluster with the smallest variance would then have been chosen. By selecting the cluster with at least a minimum size and which has a lowest variance, the values arising from the washed out images and the dirt speck are removed from the data as outliers. Further, by estimating a mean intensity value from the selected cluster, any smaller variations within the cluster due to e.g. smaller changes in lighting conditions may be averaged out to arrive at an intensity value closest to the true value of the test line. This may then be output as a result of the assay. It will be appreciated that the above example, in particular, the number of images captured, the imaging parameters under which they are captured, and the statistical modelling techniques used to filter out the anomalous images and/or combine the correct image data is given only for illustrative purposes.

The capturing of a plurality of images of the assay may comprise capturing a first number of the plurality of images under first imaging conditions, and capturing a second number of the plurality of images under second imaging conditions, which may be different to the first imaging conditions.

Beneficially, as it will not be known a priori what imaging conditions may cause an anomalous reading, capturing the plurality of images under different imaging conditions helps to ensure that the imaging conditions causing an anomalous reading are not present in all of the captured images.

For example, the first and second imaging conditions may comprise respective first and second lighting conditions. For example, the first lighting conditions may comprise continuous illumination of the assay by a light source of the imaging device at a predetermined brightness level, and the second lighting conditions may comprise illumination of the assay by ambient lighting. Further, a third number of the plurality of images may be captured under a plurality of third lighting conditions, each of the third lighting conditions comprising a respective brightness level between the first lighting conditions and the brightness level of the ambient lighting. In this way, images with a good variation of lighting conditions are captured from a strong light through varying degrees of brightness all the way down to ambient lighting only.

The different images may be collected in a quick burst to avoid any disruptions from hand movement when a handheld device such as a smartphone is used. The total duration for collecting the set of images is preferably shorter than hand movements. For example, a total duration of up to one second could be used.

Beneficially, if an anomalous reading is caused by a given lighting condition (for example the overexposed weak line from the example given above, or a strong reflection, shadow or other artefact from the test strip and/or other part of the assay that is apparent at certain brightness levels), then capturing images under different lighting conditions ensures the cause of the anomalous reading will not be present in all images. Thus, when the estimated intensity values are grouped into clusters and one cluster is selected and a mean value calculated as described above, the anomalous readings present in some of the captured images will not affect the accuracy of the reading as the majority of images will not have the lighting conditions that caused the anomalous reading.

The imaging device with which the plurality of images are captured may comprise a camera of a smartphone and the light source may comprise a light emitting diode (LED) of the smartphone operating in torch mode (i.e. an LED that is normally used as a camera flash is operated to illuminate the assay continuously). Further, the respective brightness levels described above may correspond to one or more LED intensity settings of the smartphone and the method may comprise varying the LED intensity settings to vary between the first, second, and plurality of third lighting conditions. Additionally and/or alternatively, to change the lighting conditions, the method may comprise keeping the LED intensity settings constant and instead varying the position and/or angle of the LED (for example by a user moving the smartphone in one or more planes around the assay) to vary between the first, second and plurality of third lighting conditions.

Beneficially, this allows a user device such as smartphone to be used to capture the plurality of images without the need for separate hardware or accessories. Accordingly, this enables the method according to the present disclosure to be rolled out quickly and efficiently across a wide number of assay testing locations including point-of-care testing facilities given that a large number of smartphones are likely to be available at all such facilities. Accordingly, the present disclosure is particularly suited to providing mass tasting capacity that a coordinated pandemic response may require.

The method may comprise, before estimating the intensity value from each region of interest, modifying one or more values of said pixels by performing high dynamic range processing on one or more regions of interest. The performing high dynamic range processing may comprise performing tone mapping and/or image combination on the one or more regions of interest to increase the dynamic range of the one or more regions of interest. The high dynamic range processing may be performed in real time.

Beneficially, HDR processing enhances the sensitivity of the method to weak intensity signals. However, HDR processing is typically computationally intensive and is impractical to perform on a full image. It would be too computationally intensive and/or slow to perform on all pixels of the captured images, even though that option is not excluded. However, in the present disclosure, as a region of interest is extracted which comprises only a portion of all the pixels of the captured images, HDR processing may be performed without unduly burdening the processing resources of the user device.

In an additional or alternative example to different lighting as different imaging conditions, the first and second imaging conditions may also comprise respective in-focus and out-of-focus image conditions of the test region of the assay. This may be because the imaging device focused on the wrong portion of the assay (for example, an outer surface or window of an assay housing) for some of the images.

Beneficially, in the same as above for the different lighting conditions, if an anomalous reading is caused by a given out-of-focus image condition, then capturing images under different focus conditions ensures the cause of the anomalous reading will not be present in all images. Thus, when the estimated intensity values are grouped into clusters and one cluster is selected and a mean value calculated as described above, the anomalous readings present in some of the captured images will not affect the accuracy of the reading as the majority of images will not have the out-of-focus conditions that caused the anomalous reading.

In an additional step to remove any outliers caused by out-of-focus images, a smoothness value may be estimated from some or all of the pixels of the extracted region of interest. If the estimated smoothness value exceeds a predetermined threshold, the associated region of interest may be discarded from the data, the predetermined threshold being indicative of an out-of-focus image condition.

Beneficially, an out-of-focus image typically has a high smoothness value as sharp edges that would be present in an in-focus image are instead blurry and smoothed out. Accordingly, determining smoothness of the extracted region of interest is an effective way of providing an additional way to remove outliers from the data before going on to perform the grouping into clusters. In particular, as smoothness only needs to be determined for the extracted region of interest and not the whole image, the method is computationally more efficient than calculating smoothness of the entirety of a captured image. Further, an entire image may have some portions in focus and some portions out-of-focus even where the only relevant part of the image is the test region. If the smoothness of the whole image were to be used to determine if an image was in focus or not, some images where the test region is in focus but other parts are not would be incorrectly discarded if the smoothness exceeded the threshold because of the out of focus non-test region part of the image. In contrast, the present disclosure ensures the focus condition of only the relevant part of the image (namely the extracted region of interest) is used to determine whether the image should be discarded.

By way of non-limiting simplified example of a scenario in which different focus conditions might arise, a test strip of an assay may be housed in a transparent housing or housing having a transparent window through which the test strip is visible. In such configurations, the test strip is typically housed 1-5 mm below the surface of the housing. Most cameras have limited depth-of-focus and sometimes focus on the surface of the housing or window. This may occur in 2-3 images out of 10. Normally, when camera software detects an out-of-focus condition, it uses an auto-focus function to bring the image back into focus, this typically takes time as the auto-focus function does not know what feature the user is trying to focus on and also requires processing of the entire image. In contrast, the present disclosure does not use an auto-focus function, or only uses the auto-focus for part of the process, and instead accepts that in some images, the region of interest will be out of focus. Accordingly, it limits the in-focus/out-of-focus assessment to only the extracted region of interest after the image has already been captured, and discards it if that is the case. This beneficially saves both time and computational resources. In a non-limiting example, in order to use the auto-focus on only the region of interest, one or more operating system APIs of the device on which the camera is provided may be used to programmatically set the area on which the auto-focus and/or auto-exposure is used to the area of interest. This approach may be performed in a hardware-accelerated manner. In another example, to save further processing resources, the auto-focus feature may be disabled entirely, and the user may manually adjust the focus.

Alternatively and/or additionally, in order to determine the focus quality of a given image, a spatial filter (such as a Laplacian of Gaussian filter) may be applied to the region of interest to find a narrowness of a histogram of the resulting pixel values. A histogram associated with an out-of-focus region of interest is broader (i.e. has a more spread out shape) than a histogram associated with an in-focus region of interest. Accordingly, a two-dimensional $1^{st}$ order derivative of the slope of the histogram shape may be calculated and an average thereof determined. The out-of-focus region of interest will have a lower average value than the in-focus region of interest. Accordingly, if the estimated narrowness value exceeds a predetermined threshold, the associated region of interest may be discarded from the data, the predetermined threshold being indicative of an out-of-focus image condition.

The step of estimating an intensity value of at least a portion of the pixels of the extracted region of interest may further comprise: (i) dividing the extracted region of interest into a plurality of pixel lines, each pixel line running through the control and/or test line and parallel to a direction of flow of the test strip, (ii) randomly selecting a number of the plurality of pixel lines, and (iii) for each respective pixel position along the pixel lines, calculating a respective average intensity value from the pixels in the corresponding pixel positions in each of the randomly selected pixel lines.

Beneficially, where a speck of dirt/dust/hair, reflection or other artefact is present in the extracted region of interest, it typically does not cover the whole region of interest. Accordingly, if pixel lines are taken across the length of the test strip, the speck, reflection or other artefact only has an effect on the estimated intensity values of a small number of the lines. Thus, if the average intensity value at each pixel position is calculated from the randomly selected lines, the effect of the speck/reflection/other artefact on the eventual reading is minimised.

Optionally, steps (ii) and (iii) may be repeated a predetermined number of times and the calculated averages from repetitions of step (ii) may be combined to provide the overall estimated intensity value reading for the portion of pixels of the extracted region of interest.

Beneficially, repeating this random sampling process as described above further minimises the effect a speck, reflection or other artefact has on the output reading.

The method may further comprise determining an ISO setting, which is a standard setting indicative of the sensitivity of a sensor used, as will be appreciated by the skilled person, and/or shutter speed threshold value of the imaging device used to capture to the plurality images, and providing a warning to a user if an ISO setting and/or shutter speed used to capture the plurality of images falls below or above the threshold values. The threshold value corresponds to a predetermined noise level in the captured images at which an acceptable level of reading accuracy is achieved for the given imaging device used. The threshold values of a plurality of imaging devices may be determined before any image capture takes place (for example in a workshop, factory, or testing facility) and these threshold values may be stored on a memory of the imaging device.

Beneficially, this will allow a user to be warned if the ISO settings and/or shutter speed settings of their chosen model of imaging device captures images outside of acceptable performance thresholds and thus enable them to change settings before capturing the plurality of images or to switch to a different imaging device that does fall within the acceptable performance thresholds. Instead of or in addition to a warning, the settings are adjusted such that they do fall within an acceptable range, if adjusting the settings is possible for a particular device.

In the step of capturing the plurality of images, at least one image of the plurality of images may be captured before or after a test sample is introduced to the assay to determine a contribution of ambient lighting and/or image artefacts to the estimated intensity values. For example, the plurality of images may be captured in a point-of-care testing environment with high ambient lighting (e.g. in sunny weather conditions). Capturing an image of the assay before or after a sample is introduced onto it and thus before the test and/or control line colour changes occur, allows any contribution to the intensity value caused by other factors (e.g. ambient lighting and/or artefacts) to be accounted for when the rest of the images are eventually captured with the developed test and/or control line. Accordingly, the contribution may be subtracted from the intensity values estimated after the test has taken place.

Beneficially, this improves the accuracy of the reading as background contributions to the reading are minimised or removed entirely.

The step of grouping described above may comprise applying one or more of: a local outlier factor algorithm, a robust covariance algorithm, a once class support vector machine algorithm, an isolation forest algorithm, a k-means clustering algorithm, a nearest neighbours algorithm, and a Gaussian mixture model algorithm.

Beneficially, the inventors have found the above algorithms to be effective at removing outliers and/or the variations in the estimated intensity values.

The step of extracting a region of interest may comprise inputting digital image data of each image into a trained convolutional neural network, said trained convolutional neural network configured to output a region of pixels from the input digital image data corresponding to said test region. The convolutional neural network may use one or more of: a MobileNet architecture, and/or a SSD Single Shot MultiBox Detector architecture.

Beneficially, the inventors have found that a convolutional neural network is effective in particular at extracting a region of interest corresponding to the test region of the assay.

According to a second aspect of the present disclosure, there is provided a computer-implemented method for detecting reflections in an image of a test region of an assay. The second aspect may be used as a standalone method or together with the first aspect of the present disclosure described above, for example as a step to filter out one or more of the plurality of extracted regions of interest as outliers not to be included in the step of grouping. The method comprises providing an image of an assay; from the image, extracting a region of interest comprising pixels of the image associated with a test region of the assay, the test region comprising a test and/or control line in the same way as is described above in connection with the first aspect. However, in this case the test region also comprises a continuous block of a colour in addition to test and/or control lines. This second aspect corresponds to the same features that are described in connection with the first aspect but may be used as a standalone method without the grouping into clusters of the first aspect. The continuous block of colour may have an extent along and perpendicular with the flow direction of the test strip and have a different colour to the background of the test strip which is typically white. For example, it may be at least 5 times the width of a test and/or control line and have a generally square shape (although this is given as an example only). As with the first aspect, the method comprises, from the extracted region of interest, estimating respective intensity values of at least a portion of pixels. However in this case, the portion of pixels comprises pixels corresponding to said continuous block of colour (as well as or instead of the pixels corresponding to the test and/or control lines). The method comprises determining a flatness value of said estimated intensity values of the continuous block. If the flatness value exceeds a predetermined threshold, the method comprises determining the presence of a reflection in the image, or, if the flatness value does not exceed the predetermined threshold, the method comprises determining the absence of a reflection in the image. Where a reflection is deemed to be present the extracted region of interest may be discarded.

Beneficially, as the continuous block of colour has a longer/wider extent than the test and/or control line, variations in the intensity values of the pixels of the continuous block of colour caused by the presence of a reflection become detectable where they would not be detectable from only the much narrower test and/or control line. Accordingly, the intensity values of the pixels corresponding to the continuous block of colour act as an indicator of the presence of a reflection in the image. For example, a reflection of a torch of a smartphone from the surface of a housing or window of the assay may appear as line or spot of bright white pixels in a captured image that may vary from a large white spot down to a small thin line across the captured image. The width of the test and/or control line is too narrow to encompass the whole shape of the reflection so it would not be possible to determine the presence of the reflection from the intensity values of the control line alone. Similarly, as the test strip background is white, it is not possible to determine the presence of the reflection from the background alone as the colour of the reflection is too similar to the white of the test strip. However, as the continuous block of colour is wide, it encompasses a sufficient amount of the shape of the reflection for the reflection to manifest itself in the intensity values of the continuous block. In particular, the intensity values of the block should all be approximately the same as the colour is continuous and uniform. Thus, the intensity values for the block are not uniform (i.e. they are not flat and the flatness value exceeds the predetermined threshold) a reflection is present. The flatness value may comprise one or more of a standard deviation of the estimated intensity values of the pixels of the block and/or the difference between the maximum and minimum thereof. For example, if there is no reflection present, the standard deviation will be low, for example close to 0, because all the intensity values will be very similar. Equally, the difference between the maximum and minimum intensity value will also be low for example close to 0. In contrast if the reflection is present, the standard deviation and the difference between the maximum and minimum will be higher as some intensity values will be changed by the presence of the reflection at some parts of the block in the image.

According to a third aspect of the invention, there is provided a computer-implemented method for reducing noise in a reading of a test region of an assay, the assay being a lateral flow assay and the test region comprising a portion of a test strip having a control and/or test line thereon. The method comprises: providing an image of an assay; from the image, extracting a region of interest comprising pixels of the image associated with a test region of the assay; estimating intensity values of at least a portion of the pixels from each extracted region of interest wherein estimating an intensity value of at least a portion of the pixels of the extracted region of interest comprises: (i) dividing the extracted region of interest into a plurality of pixel lines, each pixel line running through the control and/or test line and parallel to a direction of flow of the test strip; (ii) randomly selecting a number of the plurality of pixel lines; and (iii) for each respective pixel position along the pixel lines, calculating a respective average intensity value from the pixels in the corresponding pixel positions in each of the randomly selected pixel lines. This third aspect corresponds to the same features that are described in connection with the first aspect but may be used as a standalone method without the grouping into clusters of the first aspect.

Beneficially and in the same way as is described in connection with the corresponding features of the first aspect, where a speck of dirt/dust/hair, reflection or other artefact is present in the extracted region of interest, it typically does not cover the whole region of interest. Accordingly, if pixel lines are taken across the length of the test strip, the speck, reflection or other artefact only has an effect on the estimated intensity values of a small number of the lines. Thus, if the average intensity value at each pixel position is calculated from the randomly selected lines, the effect of the speck/reflection/other artefact on the eventual reading is minimised.

Optionally, steps (ii) and (iii) may be repeated a predetermined number of times and the calculated averages from repetitions of step (ii) may be combined to provide the overall estimated intensity value reading for the portion of pixels of the extracted region of interest. Beneficially, repeating this random sampling process as described above further minimises the effect a speck, reflection or other artefact has on the output reading.

A computer program may also be provided comprising instructions which, when the program is executed by a data processing apparatus and, where applicable, an imaging device cause the data processing apparatus and, where applicable, imaging device to carry out the steps of any of the above described methods.

According to a third aspect of the present disclosure, there is provided a user device comprising an imaging device and a data processing apparatus comprising means for carrying out the steps of any of the above described methods. The user device may comprise a computer-readable storage medium having stored thereon a computer program comprising instructions which, when the program is executed by the data-processing apparatus, cause the data-processing apparatus and, where applicable, the imaging device, to carry out the steps of any of the above described methods. As described above, the user device may comprise a smartphone.

Beneficially, as smartphones are widely available at point-of-care testing facilities, the advantages described above may be rolled out and scaled up quickly and efficiently as part of, for example, a response to a global pandemic.

BRIEF DESCRIPTION OF THE DRAWINGS

These and other features of the present disclosure will now be described, by way of example only, with reference to the accompanying drawings, which are.

DETAILED DESCRIPTION

Figure 1:
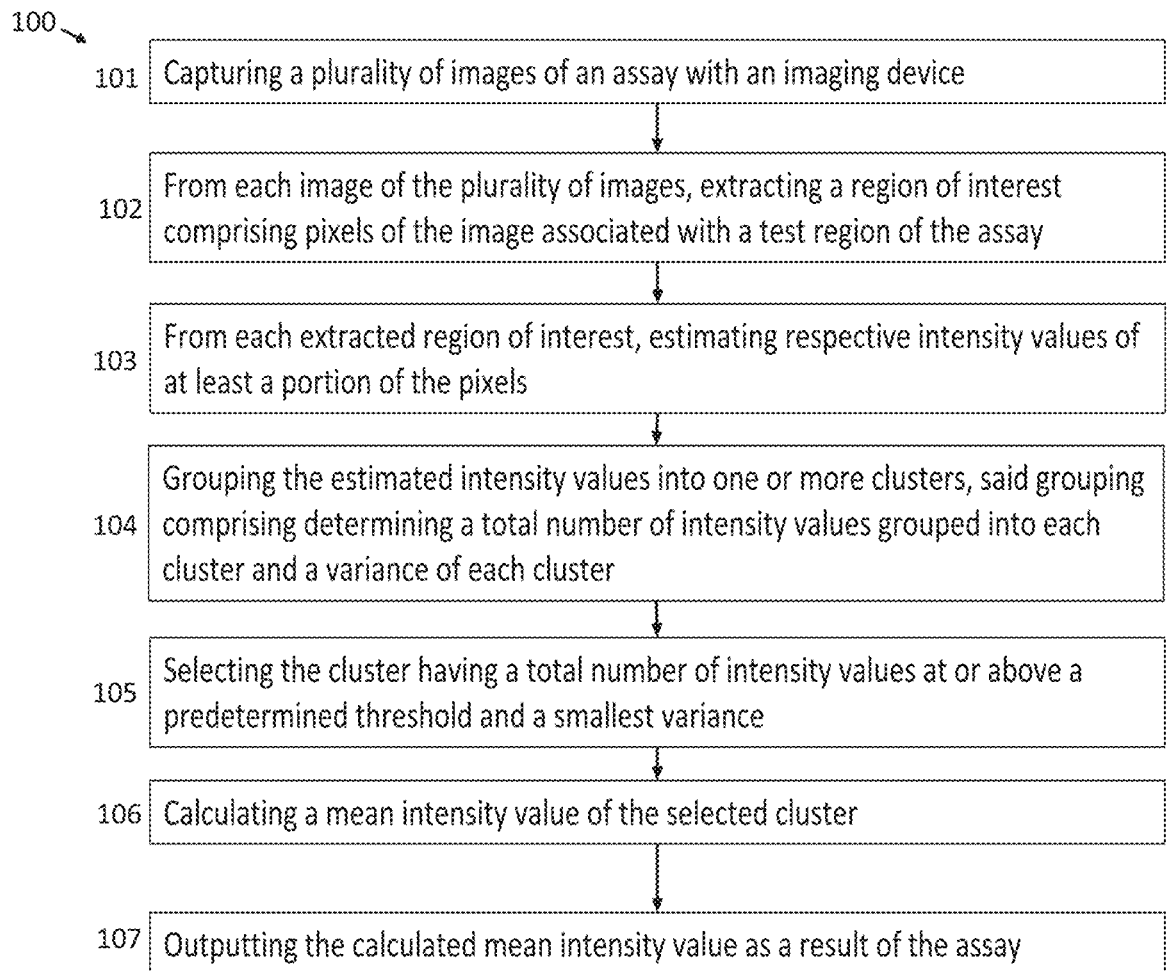
FIG. 1 is a flow chart of a method according to the present disclosure.

FIG. 1 is a flowchart of a method 100 according to the present disclosure for reading a test region of an assay. The method comprises: capturing 101 a plurality of images of an assay with an imaging device, from each image of the plurality of images, extracting 102 a region of interest comprising pixels of the image associated with a test region of the assay, from each extracted region of interest, estimating 103 respective intensity values of at least a portion of the pixels; grouping 104 the estimated intensity values into one or more clusters, said grouping comprising determining a total number of intensity values grouped into each cluster and a variance of each cluster; selecting 105 the cluster having a total number of intensity values at or above a predetermined threshold and a smallest variance; calculating 106 a mean intensity value of the selected cluster; and outputting 107 the calculated mean intensity value as a result of the assay.

Figure 2:
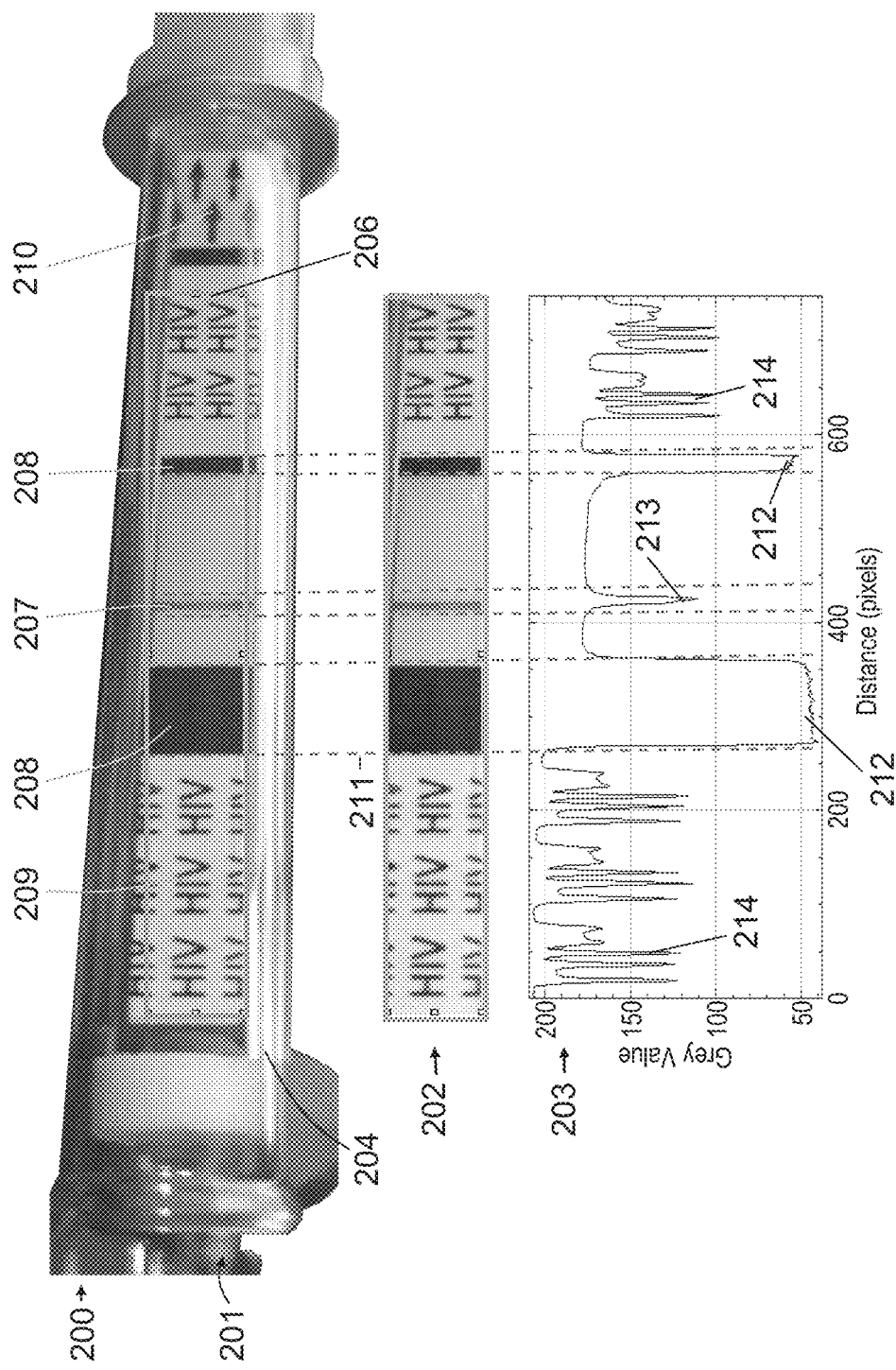
FIG. 2 illustratively shows a captured image of an assay together with an extracted region of interest and a plot of estimated intensity values of against pixel position of the extracted region of interest according to the present disclosure.

FIG. 2 illustratively shows a captured image 200 of an assay 201 together with an extracted region of interest 202 and a plot 203 of estimated intensity values of against pixel position of the extracted region of interest 202. The assay 201 shown in FIG. 2 is a lateral flow test type assay and comprises a transparent housing 204 in which a test strip 205 is provided. In the example of FIG. 2, the lateral flow test is an HIV test. The test strip has test region 206 with a test line 207. Other markings may also be optionally provided in the test region, for example one or more continuous blocks of colour 208, and/or wording 209 or symbols 210 indicating one or more flow directions and what the assay 201 is testing for, in this case HIV (although this is exemplary only). The extracted region of interest 202 is made up of pixels from the image 200 of the assay 201 corresponding to the test region 206. From the extracted region of interest, the intensity values of the pixels are estimated, as is shown in the example plot 203 where a grayscale intensity value of the pixels of the extracted region of interest 202 is plotted against pixel position (i.e. distance from the start of the region of interest 202 in units of pixels). The plot 203 is provided in inverted format in that an intensity value indicating a dark grayscale value (for example the dark colours of the continuous block 208 and test line 207) is a low value whereas an intensity value indicating a light grayscale value (for example the light colours of the white of the background test strip) is given a high value. Accordingly, dark colours present themselves as valleys against a continuous background of light colour. However, it will be appreciated that any suitable format may be used, for example a format where the dark colours present themselves as peaks against a low value light colour background, as will be appreciated by the skilled person. Similarly, the same analysis may be performed on multiple colours and in multiple dimensions, for example where the image is analysed with 3 channels such as an RGB image, as will be appreciated by the skilled person. To flatten the data from two dimensional extracted region of interest 202 to a single line plot 203, the intensity values of all the pixels at given horizontal pixel distance from the start of the region of interest may be added together to provide an overall intensity value for that pixel position. However, it is envisaged that the method may also be performed on the data in two dimensions as will be appreciated by the skilled person. For illustrative purposes, dashed lines 211 are provided to indicate approximately where in the plot different features manifest themselves. Accordingly in the plot 203 of FIG. 2, the continuous blocks 208 show as wide, approximately flat valleys 212. The test line 207 shows as a thin, narrow valley 213. The wording 209 show variously as peaks and valleys 214 which are indicative of the non-uniform nature of the letters that make up the wording which thus turns into peaks and valleys when the data is flattened in the plot 203. The intensity value associated with the depth of the valley 213 associated with the test line 207 indicates the result of the assay (i.e. how strong of a colour change the test sample caused in the test line).

In FIG. 2, there are no specks of dirt/dust/hair, reflections or other artefacts, and the image is well illuminated and the region of interest is in focus. Accordingly, if a plurality of images are captured and analysed according to the method provided herein, all the estimated intensity values of the test line will be approximately the same and will thus all be clustered into the same cluster that will have a very small variance. Accordingly, each estimated intensity value will differ only very little and be very similar to the output mean intensity value. The image in FIG. 2 is accordingly an ideal image without significantly varying imaging conditions.

Figure 3:
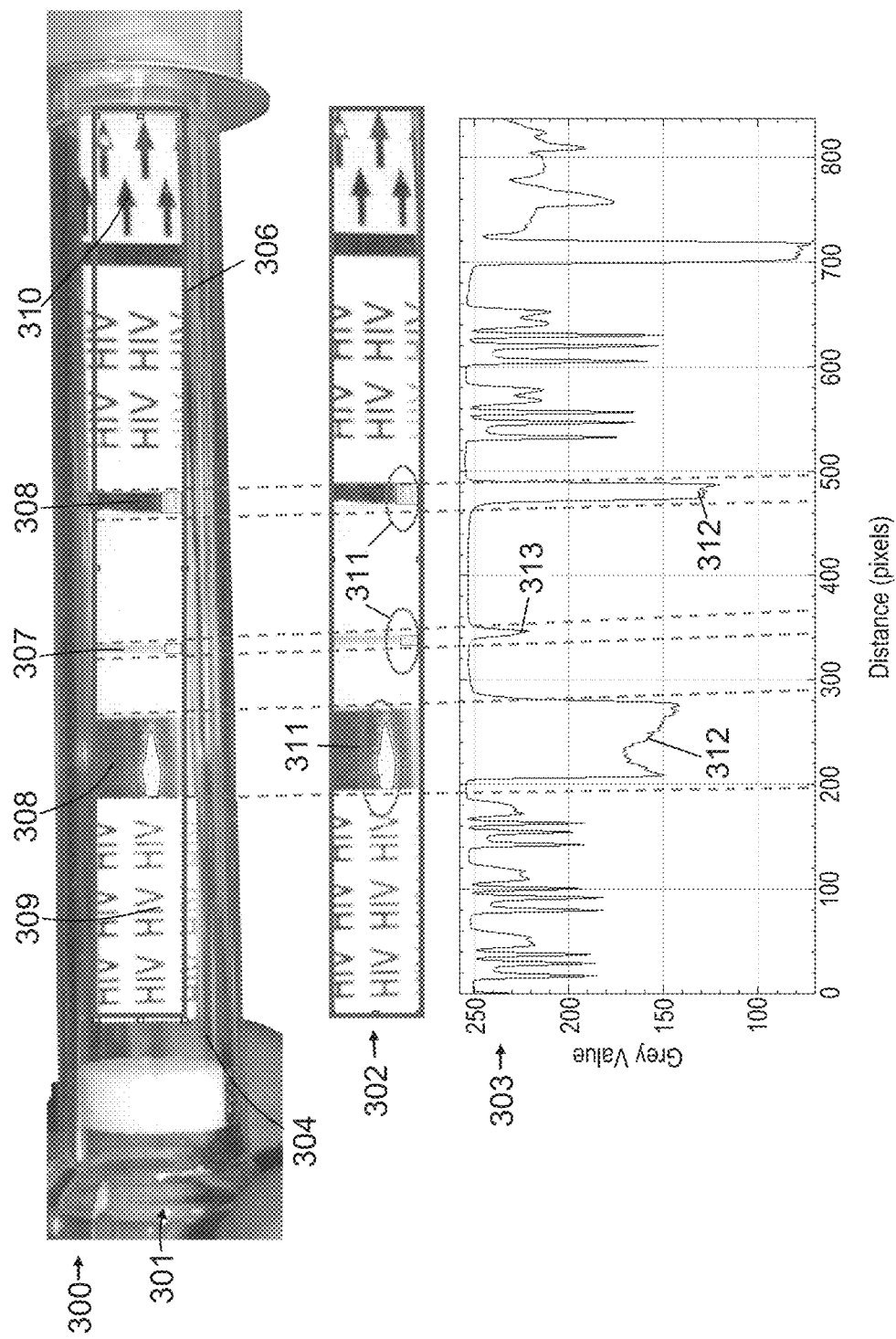
FIG. 3 illustratively shows a captured image of an assay together with an extracted region of interest and a plot of estimated intensity values of against pixel position of the extracted region of interest according to the present disclosure.

FIG. 3 similarly illustratively shows a captured image 300 of an assay 301, for example the same assay as the assay 201 of FIG. 2, together with an extracted region of interest 302 and a plot 303 of estimated intensity values of against pixel position of the extracted region of interest 302 according to the present disclosure. As with FIG. 2, the assay 301 shown in FIG. 3 is a lateral flow test type assay and comprises a transparent housing 304 in which a test strip 305 is provided. In the example of FIG. 2, the lateral flow test is an HIV test. The test strip has test region 306 with a test line 307. Other markings may also be optionally provided in the test region, for example one or more continuous blocks of colour 203, and/or wording 309 or symbols 310. However unlike in FIG. 2, the imaging conditions are such that a strong reflection from the surface of housing 304 results in regions of pixels 311 where the reflection is present appearing to have the same or similar values to the background white of the test strip. Accordingly, the intensity values of these regions are anomalous and not indicative of the true reading. In the intensity value plot 303, these reflections manifest themselves in a reduced depth of the valleys in which they are present, and or a change of shape of one or more of these valleys. For example, the valleys 312 associated with the continuous blocks of colour are no longer flat due to the contribution of the white pixels caused by the reflection and the valley 313 associated with the test line has a lower depth (again due to the white pixels caused by the reflection) which is thus no longer indicative of a true intensity value of the test line. Whilst not shown in FIG. 3, other imaging conditions (such as different lighting conditions and focus conditions) and the presence or lack thereof of specks of dirt/dust/hair, and other artefacts in the images will similarly have observable effects in the intensity value data as is illustrated in FIG. 3. It is these effects which the present disclosure assists reducing and/or eliminating.

Figure 4:
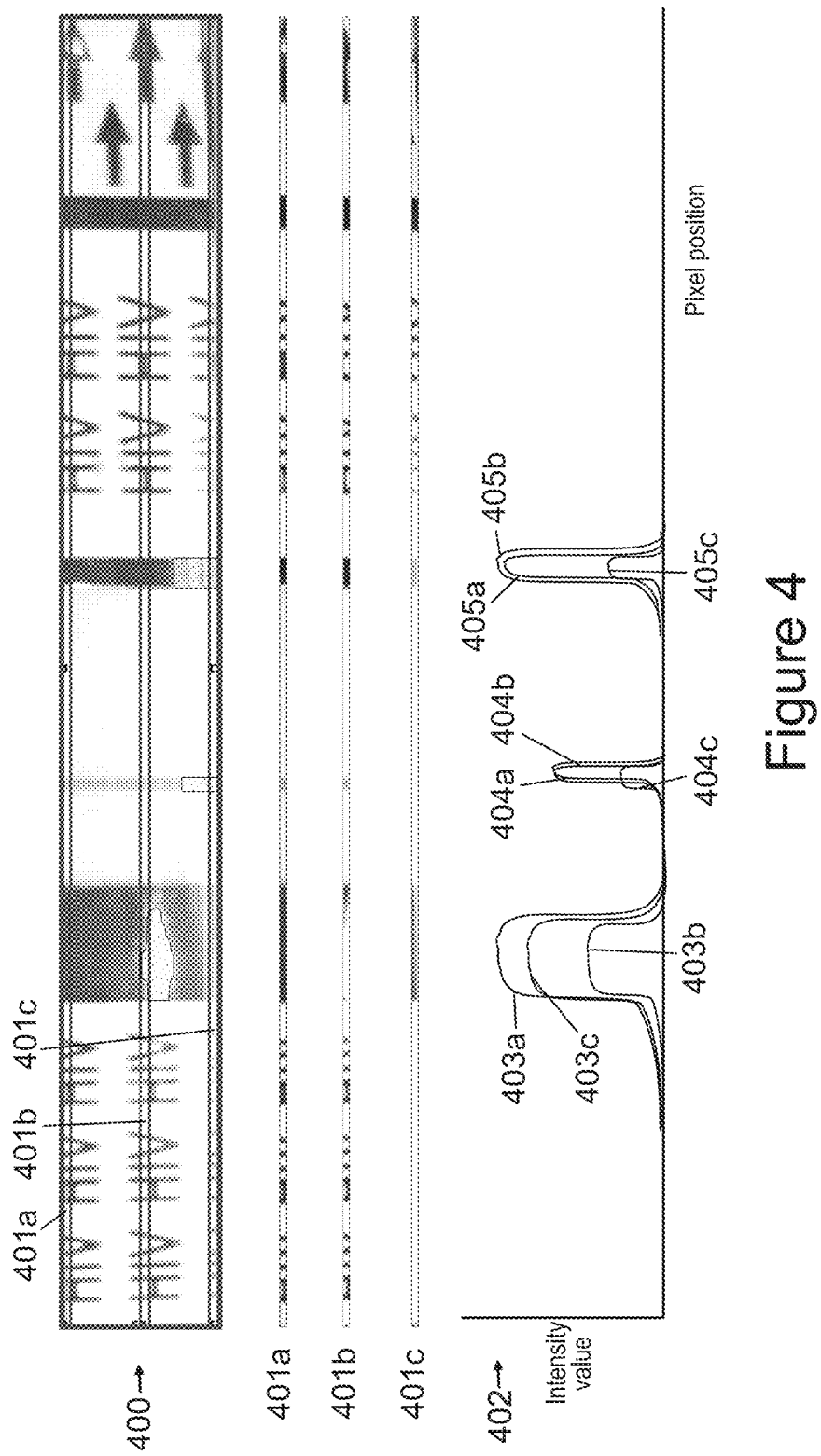
FIG. 4 illustratively shows an extracted region of interest, pixel lines across the region of interest, and a plot of estimated intensity values against pixel position of respective pixel lines of the extracted region of interest according to the present disclosure.

FIG. 4 illustratively shows an extracted region of interest 400, for example the extracted region interest 302 of FIG. 3, pixel lines 401a-c divided from the region of interest 400, and a plot 402 of estimated intensity values against pixel position of two of the respective pixel lines 401a, 401b. For illustrative purposes, the plot 402 is shown in a different format compared to the plots of FIGS. 2 and 3 in that the intensity values associated with dark colours are shown as peaks although it will be appreciated that this does not affect the analysis. As in FIG. 3, a reflection is present in the extracted region of interest and accordingly the reflection causes some of the pixels to be similar to the light colour of the background test strip. When a number of pixel lines are randomly selected (i.e. randomly sampled) from the extracted region of interest, at least some of them 401b, 401c will have intensity values affected by the reflection. Typically, however, the total number of pixel lines unaffected will be greater than those that are affected by the reflection. Accordingly, by randomly selecting a number of the pixel lines, calculating an average intensity value for each pixel position, and optionally repeating the process, the effect of the reflection is suppressed in the intensity values and the overall estimated intensity value is closer to the true value. For example, in the plot 402 in FIG. 4, peaks 403a-c, 404a-c, and 405a-c associated with the continuous blocks and the test line are shown for the three pixel lines 401a, 401b, 401c. As the reflection mostly covers a central part of the first continuous block, the central pixel line 401b has a weaker intensity value for the first continuous block and thus a lower peak 403b compared to the peaks 403a, 403c from the other pixel lines 401a, 401c. Conversely, for the test line, the greatest effect is on the pixel line 401c towards the lower part of the region of interest. Accordingly, the peak 404c associated with this pixel line 401c is also weaker compared to the peaks 404a, 404b from the other two pixel lines 401a, 401b. The same effect is apparent in for second continuous block in that the peak 405c from the lower pixel line 401c is weaker than the peaks 405a, 405b from the other pixel lines 401a, 401b. If the average intensity value from the random pixel lines samples is taken, it will be closer to the true value as long as the reflection does not appear in more than half of the samples. The random sampling may further be repeated and an average of all the random sampling results taken as an output intensity value for the test line. In this way, the effect of the reflection in the output intensity value may be suppressed. Whilst not shown in FIG. 4, other imaging conditions (such as different lighting conditions and focus conditions) and the presence or lack thereof of specks of dirt/dust/hair, and other artefacts in the images will similarly be able to be suppressed by applying the methods of the present disclosure as described with reference to FIG. 4. The method described in connection with FIG. 4 may be used in connection with the other steps described in connection with the other figures or as a standalone method as is described in connection with FIG. 7.

Figure 5:
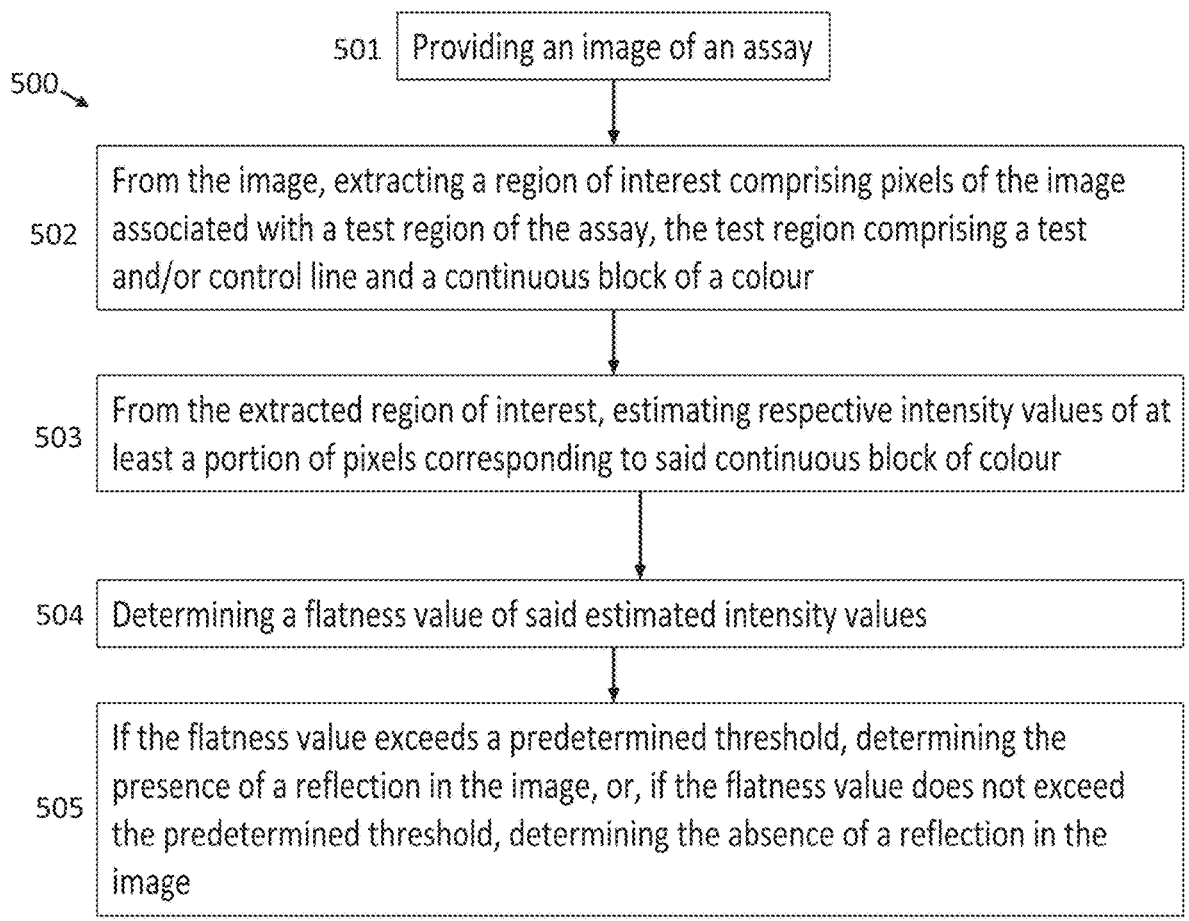
FIG. 5 is a flow chart of a method according to the present disclosure.

FIG. 5 is a flow chart of a computer-implemented method according to the present disclosure for detecting reflections in an image of a test region of an assay. The method may be used as a standalone method separate to the method described with reference to FIGS. 1-4 or it may be used together, for example as a step performed prior to the grouping into clusters of the estimated intensity values. Steps which are the same for both methods would only need to be performed once as appropriate (for example the providing an image, the extracting a region of interest, and the estimating intensity value steps would only need to be performed once). The method comprises providing 501 an image of an assay (if used with method of FIGS. 1-4, this may be one of the plurality of images), from the image, extracting 502 a region of interest comprising pixels of the of the image associated with a test region of the assay, the test region comprising a test and/or control line and a continuous block of a colour. The continuous block of colour may be, for example one of the continuous blocks of colour shown in FIGS. 2-4. The continuous block of colour will typically be wider/longer than the test line and/or other wording or symbols on the test strip. In particular, it is envisaged that the continuous block of colour has sufficient width/length for variations in a reflection (if present) to be apparent along different parts of the block such that the shape of the peak/valley in intensity values associated with the block would not be not flat. The method comprises, from the extracted region of interest, estimating 503 respective intensity values of at least a portion of pixels corresponding to said continuous block of colour; determining 504 a flatness value of said estimated intensity values; and if the flatness value exceeds a predetermined threshold, determining 505 the presence of a reflection in the image; or if the flatness value does not exceed the predetermined threshold, determining 505 the absence of a reflection in the image. As described above, the flatness value may comprise one or more of a standard deviation of the estimated intensity values and a difference between a maximum and a minimum of said intensity values. If a reflection is detected, the associated image may be discarded from the data and a user may be informed that the image was unsuitable for reading. The user may then be prompted to recapture an image under different lighting conditions and/or from a different angle to try to avoid the reflection.

Figure 6:
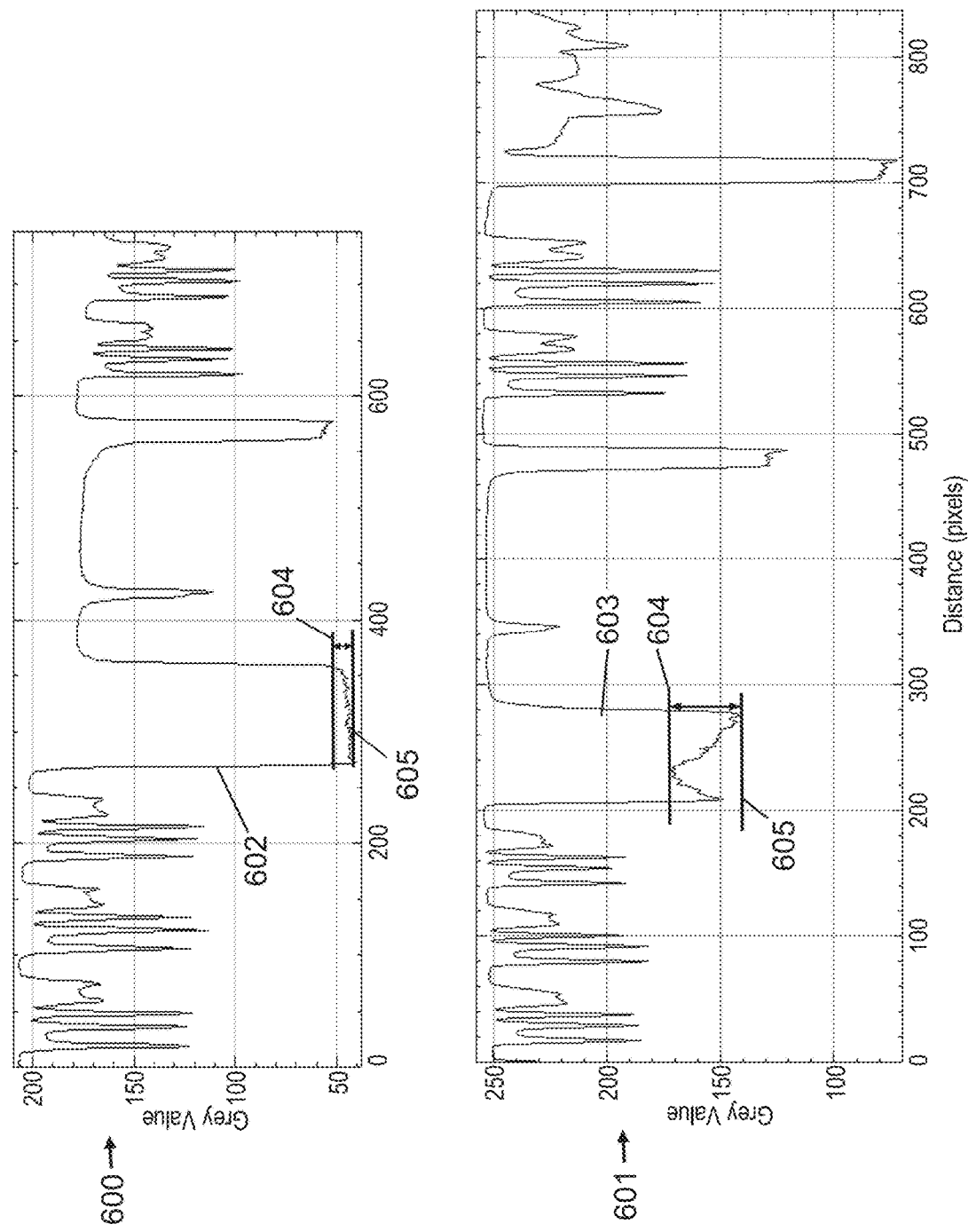
FIG. 6 illustrated two plots according to the present disclosure.

By way of illustrative example of the method of FIG. 5, FIG. 6 illustrates two plots 600, 601 of intensity value against pixel position according to the present disclosure. These may be from the images 600, 600 of the assay shown in FIGS. 2 and 3. The valleys 602, 603 associated with the continuous block of colour vary in their shape.

In the first plot 600, the bottom of the valley 602 is largely flat. This is indicative of the absence of a reflection and matches intensity values that would be obtained from an image where the pixels of the colour block are all approximately the same colour. The standard deviation of these values and the difference between a maximum 604 and a minimum 605 value is low, for example close to 0 relative to the depth of the valley 602 (for example 0-10% of the depth of the valley 602).

In contrast, in the second plot 601, the bottom of the valley 603 is not flat, for example, it has one or more slopes and/or sub peaks and valleys. This is indicative of the presence of a reflection and matches intensity values that would be obtained from an image where the pixels of the colour block have varying colours (as a result of the reflection). The standard deviation of these values and the difference between a maximum 606 and minimum 607 is high, for example greater than 10% of the depth of the valley 603 (for example around 20% of the depth of the valley 603).

It is also apparent from the two plots that the valley associated with the test line is not wide enough for a suitable change in valley shape to be determined. This is because the test line is not wide enough for any meaningful variation in the reflection to be apparent in the intensity values of the test line, thus demonstrating the advantage provided by using a continuous colour block to detect the presence of a reflection. Specifically a change in depth might be indicative of the presence of a reflection, or it may be indicative of a weaker colour change. Without the continuous block, this would be difficult to establish. Further, the peak associated with the second continuous line does show some change of shape and would provide some indication of a reflection but it is apparent that the wider continuous block (for example a colour block at least 3 times, preferably 5 or more times as wide as a test line) serves this purpose more effectively.

Figure 7:
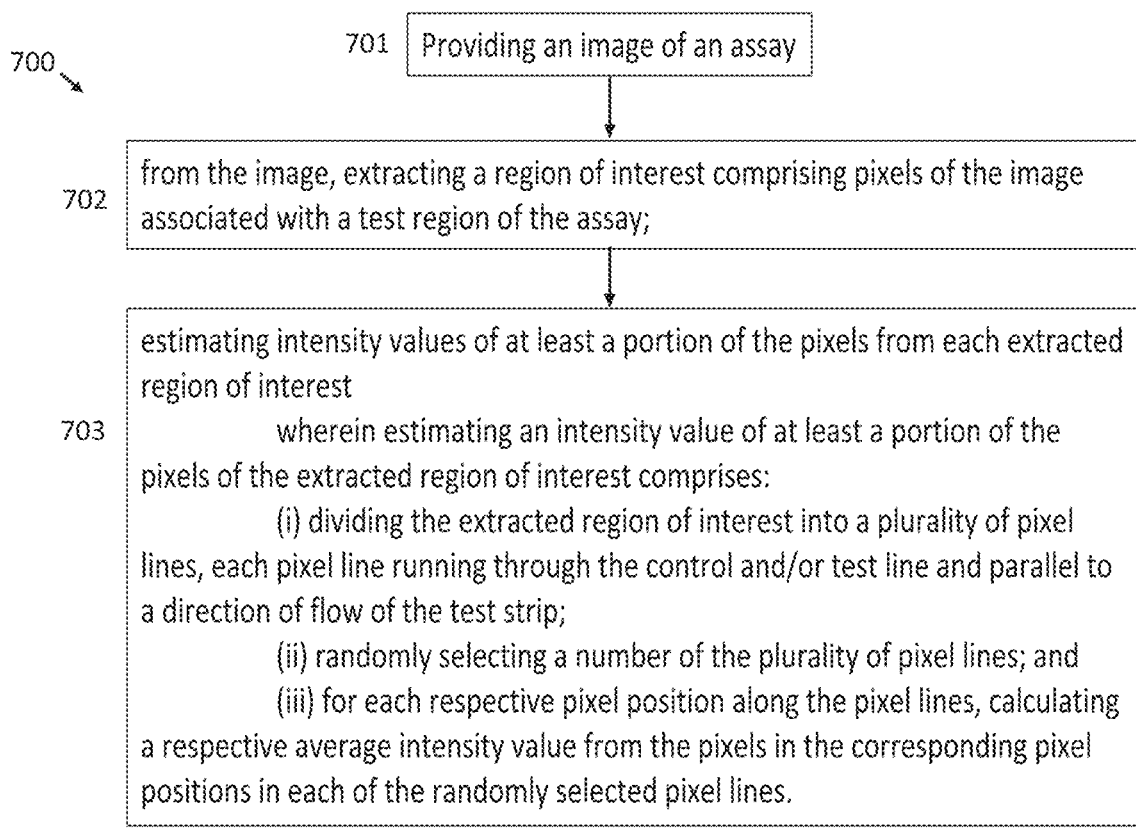
FIG. 7 is a flow chart of a method according to the present disclosure.

FIG. 7 is a flow chart of a computer-implemented method 700 according to the present disclosure for reducing noise in a reading of a test region of an assay, the assay being a lateral flow assay and the test region comprising a portion of a test strip having a control and/or test line thereon. The method 700 corresponds to the method described in connection with FIG. 4 and so may be used as a standalone method or it may be used together in the way it has been described in FIG. 4. In the same way as is described in connection with FIG. 4, the method 700 shown in FIG. 7 comprises providing 701 an image of an assay. From the image, extracting 702 a region of interest comprising pixels of the image associated with a test region of the assay. Estimating 703 intensity values of at least a portion of the pixels from each extracted region of interest. The estimating 703 an intensity value of at least a portion of the pixels of the extracted region of interest comprises (i) dividing the extracted region of interest into a plurality of pixel lines, each pixel line running through the control and/or test line and parallel to a direction of flow of the test strip; (ii) randomly selecting a number of the plurality of pixel lines; and (iii) for each respective pixel position along the pixel lines, calculating a respective average intensity value from the pixels in the corresponding pixel positions in each of the randomly selected pixel lines.

In the same way as is described above in connection with FIG. 4, steps (ii) and (iii) may optionally be repeated a number of times. In other words, the random sampling may be repeated and an average of all the random sampling results taken as an output intensity value for the test line. In this way, the effect of the reflection in the output intensity value may be suppressed.

Further, and in the same way as is described in connection with FIG. 4, other imaging conditions (such as different lighting conditions and focus conditions) and the presence or lack thereof of specks of dirt/dust/hair, and other artefacts in the images will similarly be able to be suppressed by applying the method.

Figure 8:
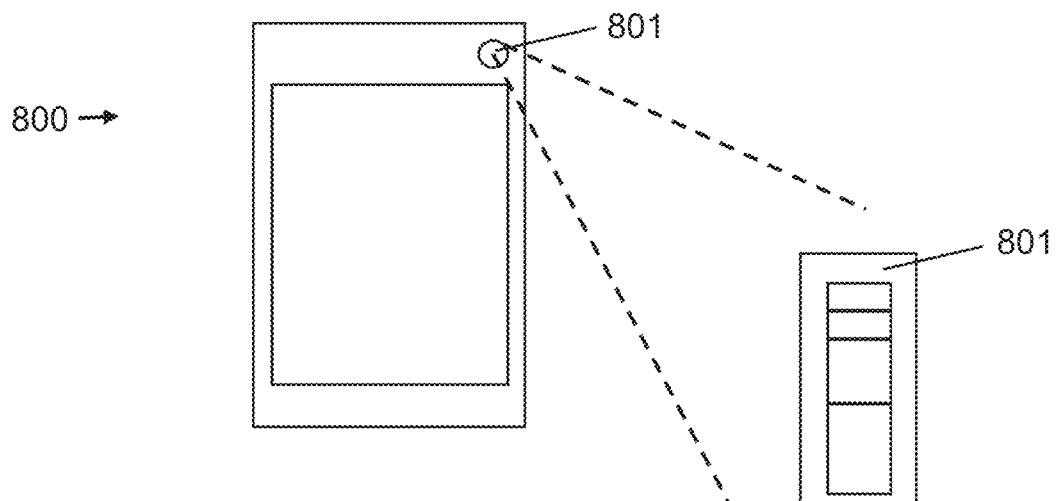
FIG. 8 illustratively shows a user device according to the present disclosure.

FIG. 8 is illustratively showing a user device according to the present disclosure. The user device 800 comprises an imaging device 801 and a data-processing apparatus, not shown in FIG. 8, comprising means for carrying out the steps of any of the methods described with reference to FIGS. 1-6. The user device 800 may further comprise a computer-readable storage medium, not shown in FIG. 8, having stored thereon a computer program comprising instructions which, when the program is executed by the data-processing apparatus, cause the data-processing apparatus and, where applicable, imaging device to carry out the steps of any of the above described methods. The user device 800 in FIG. 8 is shown to be a smartphone that is capturing one or more images of an assay 802. Accordingly, the user interface may comprise one or more interfaces. It is envisaged that other user devices which may be present at a point-of-care testing facility may also be used, for example a tablet, a smartwatch, a laptop, and/or other such devices.

Figure 9:
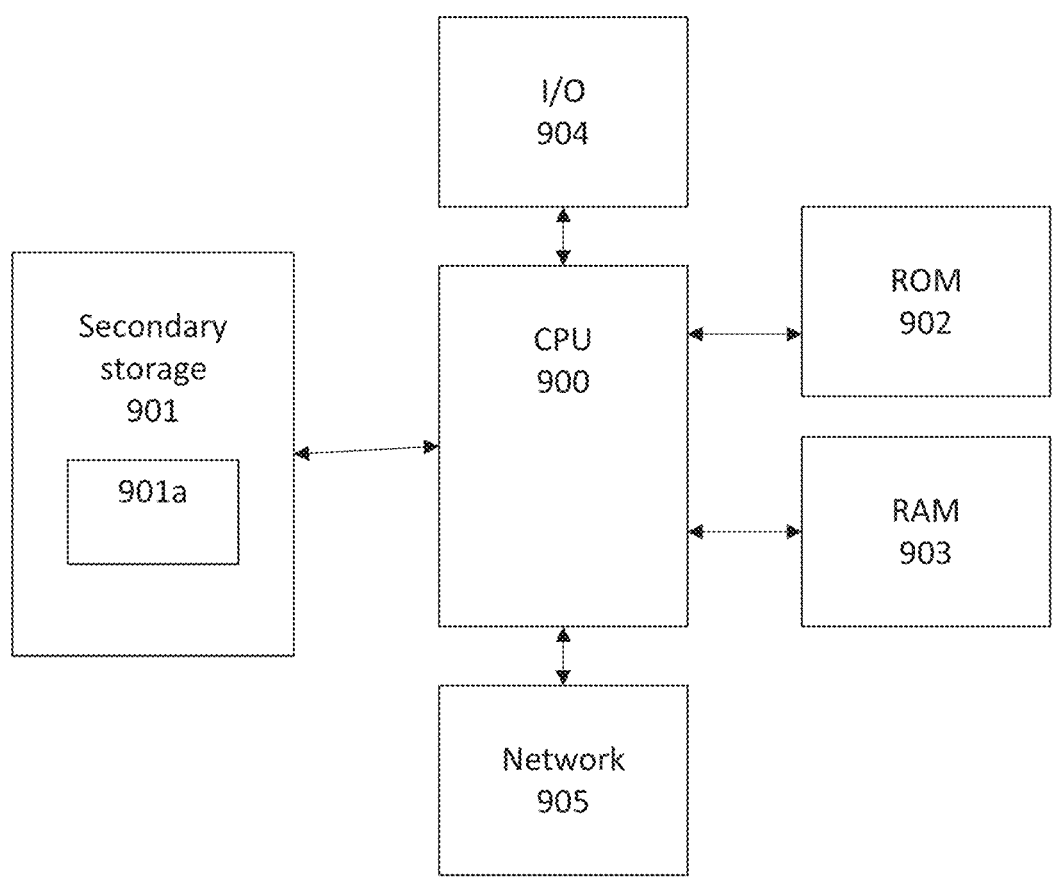
FIG. 9 illustratively shows a technical architecture according to the present disclosure.

Also provided herein, as shown by the technical architecture in FIG. 9, is an exemplary data-processing apparatus comprising means for carrying out the steps of the methods of any of the above embodiments. In some embodiments the method steps herein are carried out entirely on a CPU which is cheaper than a GPU and may be more suitable for a user device, for example a smartphone.

The data-processing apparatus may comprise a processor 900 that is in communication with memory devices including secondary storage 901 (such as disk drives), read only memory (ROM) 902, random access memory (RAM) 903. The processor 900 may be implemented as one or more CPU chips, which are cheaper than GPUs. The data-processing apparatus may further comprise input/output (I/O) devices 904, and network connectivity devices 905.

The secondary storage 901 is typically comprised of one or more drives (for example SSD) and is used for non-volatile storage of data and as an over-flow data storage device if RAM 903 is not large enough to hold all working data. Secondary storage 901 may be used to store programs which are loaded into RAM 903 when such programs are selected for execution.

In this embodiment, the secondary storage 901 has an order processing component 901a comprising non-transitory instructions operative by the processor 900 to perform various operations of the method of the present disclosure. The ROM 902 is used to store instructions and perhaps data which are read during program execution. The secondary storage 901, the RAM 903, and/or the ROM 902 may be referred to in some contexts as computer readable storage media and/or non-transitory computer readable media.

I/O devices 904 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 905 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 905 may enable the processor 900 to communicate with the Internet or one or more intranets. With such a network connection, it is contemplated that the processor 900 might receive information from the network, or might output information to the network in the course of performing the above-described method operations. Such information, which is often represented as a sequence of instructions to be executed using processor 900, may be received from and outputted to the network, for example, in the form of a computer data signal embodied in a carrier wave.

The processor 900 executes instructions, codes, computer programs, scripts which it accesses from hard disk, floppy disk, optical disk (these various disk based systems may all be considered secondary storage 901), flash drive, ROM 902, RAM 903, or the network connectivity devices 905. While only one processor 900 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 900, the RAM 903, and the ROM 902 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Also provided herein is a computer program and a computer-readable storage medium for storing the computer program, comprising instructions which, when the program is executed by a computer, cause the computer to carry out the steps of the methods of any of the above embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

For example, the term intensity value as used herein may refer not only to a raw intensity value but also to a value derived from an intensity value. For example, the estimated intensity value may refer to a ratio of the raw intensity values of the pixels associated with a test line to the raw intensity values of pixels associated with a control line such that the estimated intensity value is a ratio rather than raw data. Accordingly the calculated mean intensity value is a mean of these intensity value derived ratios and the outputted result of the assay is this mean ratio. Beneficially, such a ratio helps reduce the impact of variations that may be common across an entire region of interest.

The invention claimed is:

1. A method for reading a test region of an assay, the method comprising:
    capturing a plurality of images of an assay with an imaging device;
    extracting a region of interest from each image of the plurality of images, the region of interest comprising pixels of the image associated with a test region of the assay;
    estimating intensity values of at least a portion of the pixels from each extracted region of interest;
    grouping the estimated intensity values into one or more clusters, determining a total number of intensity values grouped into each cluster and a variance of intensity values in each cluster;
    selecting the cluster having a total number of intensity values at or above a predetermined threshold and a variance below the variance of other clusters;
    calculating a mean intensity value of the selected cluster; and
    outputting the calculated mean intensity value as a result of the assay;
    wherein the assay is a lateral flow assay;
    wherein the test region comprises a portion of a test strip having a control and/or test line thereon;
    wherein the respective portions of pixels in the extracted regions of interest from which the respective intensity values are estimated comprise portions of pixels corresponding to the test line and/or control line of the assay; and
    wherein estimating the intensity values of at least a portion of the pixels of the extracted region of interest comprises:
        (i) dividing the extracted region of interest into a plurality of pixel lines, each pixel line running through the control and/or test line and parallel to a direction of flow of the test strip;
        (ii) randomly selecting a number of the plurality of pixel lines; and
        (iii) for each respective pixel position along the pixel lines, calculating a respective average intensity value from the pixels in the corresponding pixel positions in each of the randomly selected pixel lines.

2. The method of claim 1, wherein capturing a plurality of images of the assay comprises:
    capturing a first number of the plurality of images under first imaging conditions; and
    capturing a second number of the plurality of imaged under second imaging conditions, different to the first imaging conditions.

3. The method of claim 2, wherein the first and second imaging conditions comprise respective first and second lighting conditions.

4. The method of claim 3, wherein:
    the first lighting conditions comprise continuous illumination of the assay by a light source of the imaging device at a predetermined brightness level; and
    the second lighting conditions comprise illumination of the assay by ambient lighting.

5. The method of claim 4, wherein the imaging device comprises a camera of a smartphone and the light source comprises a light emitting diode (LED) of the smartphone in torch mode.

6. The method of claim 5, further comprising:
    capturing a third number of the plurality of images under third imaging conditions, the third imaging conditions comprising a plurality of third lighting conditions.

7. The method of claim 6, wherein each of the third lighting conditions comprises a respective brightness level between the predetermined brightness level of the first lighting conditions and a brightness level of the ambient lighting.

8. The method of claim 7,
    wherein the respective brightness levels correspond to one or more LED intensity settings of the smartphone; and
    wherein the method comprises varying the LED intensity settings to vary between the first lighting conditions, the second lighting conditions, and the plurality of third lighting conditions; or
    wherein the method comprises keeping the LED intensity settings constant while varying the position and/or angle of the LED between the first lighting conditions, the second lighting conditions, and the plurality of third lighting conditions.

9. The method of claim 1, further comprising:
    before estimating the intensity value from each region of interest, modifying one or more values of said pixels by performing high dynamic range processing on one or more of the regions of interest.

10. The method of claim 9, wherein performing high dynamic range processing on the one or more regions of interest comprises performing tone mapping and/or image combination on the one or more regions of interest to increase the dynamic range of the one or more regions of interest.

11. The method of claim 9, wherein the high dynamic range processing is performed in real time.

12. The method of claim 2, wherein the first and second imaging conditions comprise respective in-focus and out-of-focus image conditions of the test region of the assay.

13. The method of claim 12, further comprising:
    for each extracted region of interest, estimating a smoothness value from the portion of the pixels of the extracted region of interest; and
    discarding said extracted region of interest if the estimated smoothness value exceeds a predetermined smoothness threshold, said threshold being indicative of an out-of-focus image condition.

14. The method of claim 1, further comprising:
    repeating steps (ii) and (iii) a predetermined number of times; and
    combining the calculated average intensity values to generate said estimated intensity value for said portion of pixels of said extracted region of interest.

15. The method of claim 1, further comprising:
    determining an International Organization for Standardization (ISO) setting and/or shutter speed threshold value; and providing a warning indication to a user if an ISO setting and/or a shutter speed setting of the imaging device fall above or below the ISO setting and/or shutter speed threshold value, wherein the shutter speed threshold value corresponds to a predetermined noise level in the captured images.

16. The method of claim 1:

wherein at least one image of the plurality of images is captured before a test sample is introduced to the assay to determine a contribution of ambient lighting and/or image artefacts to said estimated intensity values; and subtracting said contribution from the estimated intensity values estimated from the plurality of images captured after a test sample is introduced to the assay.

17. A user device comprising:

an imaging device;

a data-processing apparatus; and a computer-readable storage medium having stored thereon a computer program comprising instructions which, when the computer program is executed by the data-processing apparatus and, where applicable, the imaging device, cause the data-processing apparatus and, where applicable, imaging device to carry out the steps of the method of claim 1.

18. The user device of claim 17, wherein said user device comprises a smartphone.

* * * * *